Patented Nov. 13, 1934

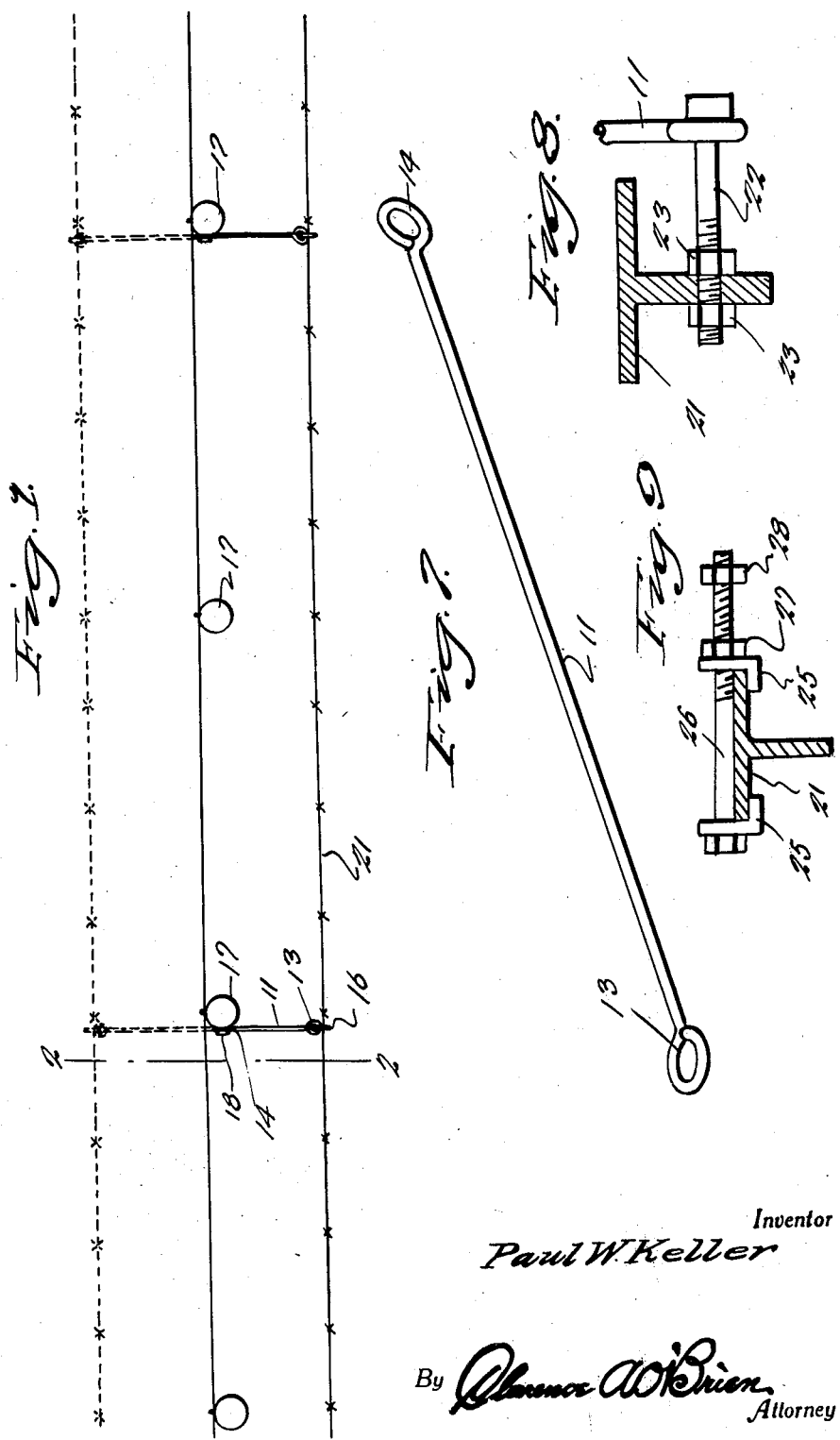

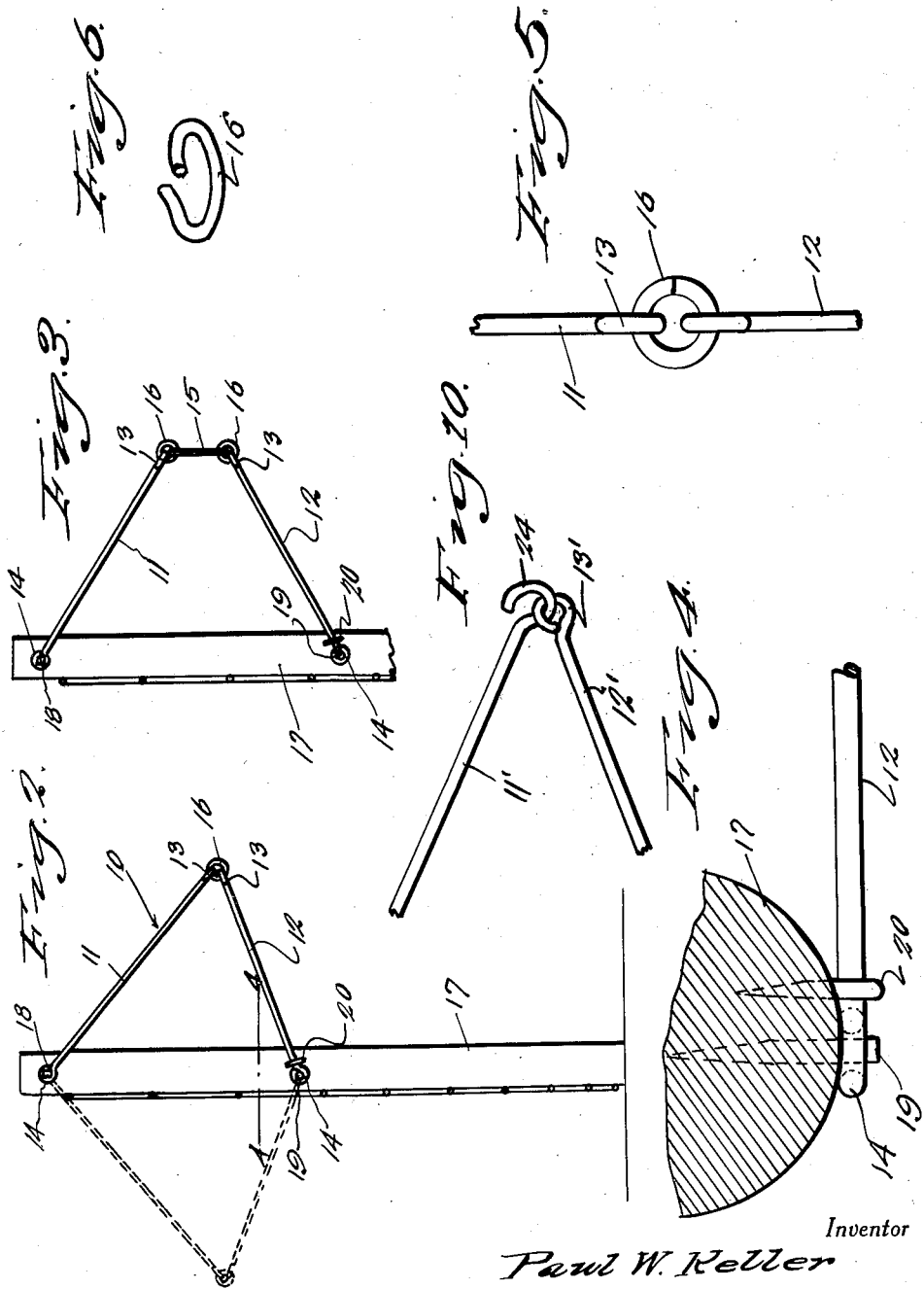

1,980,919

UNITED STATES PATENT OFFICE 1,980,919

REVERSIBLE BARB WIRE HOLDER

Paul W. Keller, Rawson, Ohio

Application March 26, 1934, Serial No. 717,531

8 Claims. (Cl. 256—3)

This invention has reference to devices for protecting wire fences against destruction by animals and also to prevent the animals from getting sufficiently close to the fence as to project the head between the wires of the fence to eat growing crops planted at the side of the fence opposite to the animal.

An important object of the invention is to provide a holder of the character above mentioned which is reversible, that is can be readily shifted from one side to the other of the fence and which is extremely simple in construction and can be readily applied.

The invention together with its objects and advantages will be best understood from a study of the following description taken in connection with the accompanying drawings wherein:

Figure 1 is a top plan view illustrating the application of the invention.

Figure 2 is a sectional view taken substantially on the line 2—2 of Figure 1.

Figure 3 is an enlarged elevational view of a slightly modified form of the invention.

Figure 4 is an enlarged fragmentary sectional elevational view taken substantially on the line 4—4 of Figure 2.

Figure 5 is an elevational view illustrating one manner and means for connecting the adjacent ends of the rods forming part of the holder.

Figure 6 is a perspective view of the connecting ring, the same being in open condition.

Figure 7 is a perspective view of one of the rods.

Figure 8 is a fragmentary detail sectional view showing the manner of connecting the holder to a metallic fence post.

Figure 9 is a view similar to Figure 8 showing still another device for connecting one end of the holder to a metallic fence post.

Figure 10 is a perspective view showing a modified form of connecting the rods together.

Referring to the drawings by reference numerals it will be seen that in accordance with the present invention any desired number of barb wire holders indicated generally by the reference numeral 10 may be used. Each holder 10 comprises a pair of rods 11, 12 and each rod is provided at one end with an eye 13 and at a relatively opposite end with an eye 14 disposed in a plane at right angles to, or perpendicular to the plane of the eye 13.

In the form of the invention shown in Figure 2 the rods 11 and 12 are connected at one end through the medium of a ring 16 that engages the eyes 13 of said rods.

In the form of the invention shown in Figure 3 the rods 11 and 12 are connected at one end by having the rings 16 engaged with the eyes 13 and these rings 16 in turn engaged with eyes provided at opposite ends of a connecting link or rod 15. The form of the invention shown in Figure 3 will be especially adapted where each holder is to be used for accommodating a pair of barbed wires 21 in spaced parallelism to each other, while the form of the invention shown in Figure 2 will be used where but a single wire 21 is employed and as suggested in Figure 1.

In the form of the invention shown in Figure 10 one of the rods, for example the rod 11' instead of being provided with an eye 13 is provided with an open eye or loop 24 that is adapted to engage the eye 13' of the other of the rods, in this instance the rod 12' and the open eye or hook 24 of the rod 11' is adapted to accommodate the barbed wire 21 in a manner thought apparent.

It will be seen that in actual practice the holders 10 are mounted on alternate fence posts 17. In the present instance the fence posts 17 are indicated as being of wood and a holder 10 is secured to its fence post in the following manner. The rod 11 or 11', as the case may be, of the holder at its free end is pivoted to one side of the fence post 17 through the medium of a spike or other suitable fastening element 18 driven into the fence post and engaging the eye 14 of the rod. The spike 18 is disposed above the uppermost wire of the fence as suggested in Figures 2 and 3. This will obviously permit the rod 11, or 11' to be swung from one side to the other of the fence.

The rod 12, or 12' as the case may be, at its free end has its eye 14 engaged with a headless nail or spike 19 driven into the post as clearly shown in Figure 4, and at said end the rod 12 or 12', is straddled by a staple 20 that is likewise driven into the post to hold the rod 12 or 12' against one side of the post. It will thus be seen that the holder 10 will project laterally from the post 17, and in the form of the invention shown in Figure 2 the barbed wire 21 threaded through the rings 16 will be supported by the holders in spaced parallelism to the fence and in a manner to effectually interfere with any attempt on the part of the animal to get into immediate proximity of the fence. In the form of the invention shown in Figure 3 a pair of barb wires 21 will be threaded through the rings 16. Where the form of the invention, as illustrated in Figure 10, is used a single barb wire 21 will also be employed.

It will be apparent that the holder 10 can be readily shifted from the full line position shown in Figure 2 to the dotted line position shown in said figure.

In using the barbed wire support in conjunction with metallic fence posts, as for example in conjunction with a fence post such as shown in Figure 8 and indicated by the reference numeral 21 the eyes 14 are engaged with bolts 22 which latter having threaded ends passed through suitably spaced apertures provided in the rib of the post and secured in position through the medium of lock nuts 23 arranged at opposite sides of the rib.

It will also be understood that in actual practice the members 11 and 12 of each holder may be suspended perpendicularly, with the members 12 free of all engagement with the fence post and the members 11 engaged with the post as at 14. Such use of the device will be found desirable where crops are cultivated on both sides of the fence.

In Figure 9 I have illustrated still another device which may be employed in conjunction with a metallic fence post for securing the ends of the rods of the holder thereto. In this form of the invention there are provided two L-shaped lugs 25 that engage opposite longitudinal edges of the post 21, and these lugs have free end portions projecting laterally from the side of the post opposite to the rib of the post, and the projected ends of the lugs are apertured to accommodate a tie bolt 26. The bolt 26 has a threaded end on which is threaded a nut 27 adapted to bear against an adjacent one of the lugs 25 for securing the device in position on the fence post. Also threadedly engaged with said end of the bolt 26 is a second nut 28 and the eye 14 of a rod 11, 12 or 11', or 12', as the case may be is loosely engaged with the threaded end of the bolt 26 between the nuts 27, 28 as thought apparent.

Having thus described my invention, what I claim as new is:

1. In combination with a fence having a plurality of spaced posts, of a plurality of barb wire holders, one for each post, and each holder including a pair of rods adapted to be secured at one end to the fence post to extend laterally therefrom at an angle relative to one another, and a link connecting the free ends of the rods, and a barbed wire threaded through said links.

2. For use with wire fences, a barbed wire holder comprising a pair of rods and a link connecting the rods at one end.

3. For use with wire fences, a barbed wire holder comprising a pair of rods and a link connecting the rods at one end, each of said rods at said one end being provided with an eye to receive the link, and at an opposite end with an eye disposed at right angles to the first eye and adapted to engage a fastening element for attachment to a fence post.

4. A barb wire holder for wire fences comprising a pair of rods provided each at one end for detachable engagement with a fence post, and at a relatively opposite end with an eye, rings engaging said eyes, and a short connecting rod having eyes at the ends thereof engaging said rings.

5. For use with wire fences, a barb wire holder comprising a pair of rods provided at one end for attachment to the post of the fence, and at a relatively opposite end with an eye, and a connecting ring engaging the eyes of the rods connecting said rods at the last named end thereof, said ring being adapted to have the barbed wire to be supported by the device threaded therethrough.

6. A holder for a strand of barb wire for supporting the latter in operative position relative to a wire fence, said holder comprising a pair of rods, means connecting said rods at one end and for engaging a portion of the barb wire to be supported by the holder, and means for operatively connecting the free end of each rod to a fence post comprising a bolt having a part adapted to be passed through an opening in the fence post, nuts threaded on said part of the bolt adjacent the fence post at opposite sides thereof, said bolt having a free end portion adapted to engage one of said rods, and each rod having an eye to accommodate said bolt.

7. A barb wire holder for wire fences comprising a pair of rods, means connecting said rods at one end and including means for engaging the barb wire to be supported by the holder, each of said rods having a free end provided with an eye, and means for connecting said free end of each rod with the fence post comprising a bolt adapted to pass through said eye and having a part adapted to pass through an opening in the fence post, and nuts threadedly engaged with said part of the bolt and engaging opposite sides of the fence post for securing the bolt thereto.

8. A device for holding a barb wire strand in operative position to a wire fence comprising a pair of rods, means operatively connecting the rods at one end and including means for engaging the barbed wire, each of said rods having an eye at its free end, and means for operatively connecting the free end of each rod with a fence post comprising a bolt, a pair of lugs loosely engaged with the bolt and adapted to engage a fence post at opposite sides thereof, a nut threadedly engaged with one end of the bolt and adapted to bear against one of the lugs for holding the same engaged with the fence post, and a second nut threaded on the bolt and cooperable with the first nut for retaining the eye of a rod on said bolt.

PAUL W. KELLER.